(12) United States Patent
Klagge et al.

(10) Patent No.: US 8,193,281 B2
(45) Date of Patent: Jun. 5, 2012

(54) COPOLYMERIZABLE SURFACTANTS (2)

(75) Inventors: Ronald Klagge, Erkrath (DE); Uwe Held, Velbert (DE); Thomas Mausberg, Haan (DE); Katharina Hömberg, Hilden (DE); Thomas Schliwka, Bergisch Gladbach (DE)

(73) Assignee: Cognis IP Management GmbH, Duesseldorf (DE)

( * ) Notice: Subject to any disclaimer, the term of this patent is extended or adjusted under 35 U.S.C. 154(b) by 121 days.

(21) Appl. No.: 12/824,369

(22) Filed: Jun. 28, 2010

(65) Prior Publication Data
US 2010/0331485 A1 Dec. 30, 2010

(30) Foreign Application Priority Data

Jun. 27, 2009 (EP) .................... 09008430

(51) Int. Cl.
*C08F 2/16* (2006.01)
*C08F 220/18* (2006.01)
*C08G 18/62* (2006.01)
*C08G 73/10* (2006.01)
*B32B 21/08* (2006.01)

(52) U.S. Cl. ........ 524/832; 524/804; 524/833; 524/845; 524/846

(58) Field of Classification Search ................ 524/904, 524/832, 833, 845, 846
See application file for complete search history.

(56) References Cited

U.S. PATENT DOCUMENTS

| 5,750,770 | A * | 5/1998 | McEntire et al. ............. 560/200 |
| 6,602,949 | B2 | 8/2003 | Furukawa et al. |
| 7,812,106 | B2 | 10/2010 | Breuer et al. |
| 2005/0070679 | A1 * | 3/2005 | Breuer et al. ............. 526/317.1 |

FOREIGN PATENT DOCUMENTS

| DE | 1983706 | 1/2000 |
| DE | 10340081 A1 | 3/2005 |
| EP | 1512703 | 3/2005 |
| WO | WO-03/054026 | 7/2003 |

OTHER PUBLICATIONS

European Search Report in EP 09008430, dated Oct. 26, 2009, 2 pgs.
Schoonbrood, Harold A. et al., "Reactive Surfactants in Heterophase Polymerization. Emulsion Copolymerication Mechanism Involving Three Anionic Polymerizable Surfactants (Surfmers) with Styrene-Butyl Acrylate-Acrylic Acid", *Macromolecules*, 30, XP-002523871 1997, 6024-6033.
Hamaide, T., et al., "Synthesis and NMR characterization of new poly(ethoxyalkyl) maleates", *Polymer Bulletin*, 33, 1994, 133-139.

* cited by examiner

*Primary Examiner* — William Cheung
(74) *Attorney, Agent, or Firm* — Diehl Servilla LLC

(57) ABSTRACT

The invention is directed to the use of maleic esters selected from compounds of formulae (I) and (II) as copolymerizable emulsifiers in the emulsion polymerization of olefinically unsaturated monomers, in which A is an alkyl group having 3 to 40 carbon atoms; X and Z independently are hydrogen or methyl; M is hydrogen, an alkali metal, alkaline earth metal, or an ammonium or other amine salt; and n and p independently are numbers in the range from 0 to 40.

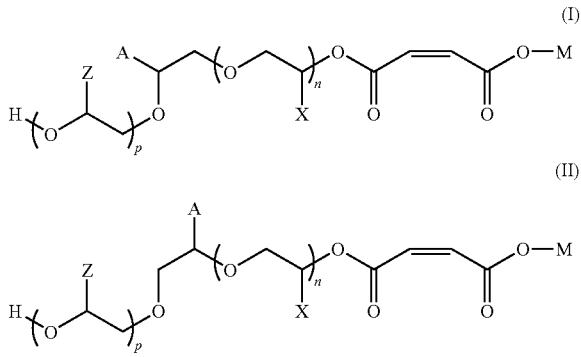

3 Claims, No Drawings

COPOLYMERIZABLE SURFACTANTS (2)

CROSS-REFERENCE TO RELATED APPLICATIONS

The present application claims priority under USC 35 §119 of European Patent Application 09008430.2, filed Jun. 27, 2009, which is incorporated herein by reference in its entirety.

FIELD OF THE INVENTION

The invention is situated within the polymer sector and pertains to the use of maleic esters of specific structure as emulsifiers in emulsion polymerization, and also to a process for preparing polymers by emulsion polymerization using specific copolymerizable emulsifiers.

BACKGROUND OF THE INVENTION

Emulsion polymerization is a specific process of polymerization in which olefinically unsaturated monomers of low water solubility are emulsified in water by means of emulsifiers and are polymerized using water-soluble initiators such as, for example, potassium peroxodisulfate or redox initiators. Anionic and/or nonionic surfactants are the key constituents here. Via micelle construction in the aqueous solution, they ensure the process of emulsion polymerization.

Copolymerizable emulsifiers are in great demand in industry, since they are wholly or partly incorporated into the growing polymer chain and thus reduce, for example, the migration of free emulsifier molecules in the end application product. Copolymerizable emulsifiers occupy a middle position between monomers and conventional emulsifiers. In this position, they must be tailored to the monomer system used, in respect of their reactivity, and must not adversely alter the properties of the resultant polymer. At the same time, they must not lose their emulsificative properties as a result of the presence of a reactive group. On the basis of this combination of specific properties, there is a great demand on the part of industry for new copolymerizable emulsifiers.

German laid-open specification DE-A-10340081 describes copolymerizable surfactants of the formula HOOC—CH=CH—COO—(BO)$_z$, (PO)$_y$(EO)$_x$R$^1$ in which R$^1$ is an alkyl group or alkylphenol group having 8 to 24 carbon atoms, BO is a butylene oxide unit, PO is a propylene oxide unit, and EO is an ethylene oxide unit, and the numbers x, y, and z independently are 0 or numbers from 1 to 50, with the proviso that at least one of the numbers x, y, and z is other than 0, it being possible for the carboxyl group to be present partly or wholly in neutralized form and for the C=C double bond to have the cis or trans configuration.

Schoonbrood et al. in Macromolecules 1997 (30), 6024-6033 in table 1 (top of page 6025) describes an anionic surfactant "M14" for use as an emulsifier in emulsion polymerization, having the formula NaO$_4$SC$_3$H$_6$OCOCH=CHCOOC$_{14}$H$_{29}$—which can also be written in the form NaO$_3$SO—C$_3$H$_6$O—COCH=CHCOOC$_{14}$H$_{29}$.

DETAILED DESCRIPTION OF PREFERRED EMBODIMENTS

It was an object of the present invention to provide compounds which, alone or in a blend with other compounds, are suitable as copolymerizable emulsifiers for emulsion polymerization.

In the context of their use as emulsifiers for emulsion polymerization, these compounds ought to have the effect in particular that there is only a low level of formation of coagulum. Moreover, these copolymerizable emulsifiers in an aqueous presentation form ought to be pourable and pumpable.

Lastly, through their use as emulsifiers in emulsion polymerization, it ought to be possible to obtain latices which, relative to those latices prepared with comparable, noncopolymerizable emulsifiers, exhibit improved properties in respect of electrolyte stability, alkali resistance and/or viscosity.

The invention first provides for the use of maleic esters selected from compounds of the general formulae (I) and (II), in which:
A is an alkyl group having 3 to 40 C atoms,
X and Z independently are hydrogen or a methyl group,
M is hydrogen, an alkali metal or alkaline earth metal, or an ammonium or other amine salt,
n and p independently are a number in the range from 0 to 40,

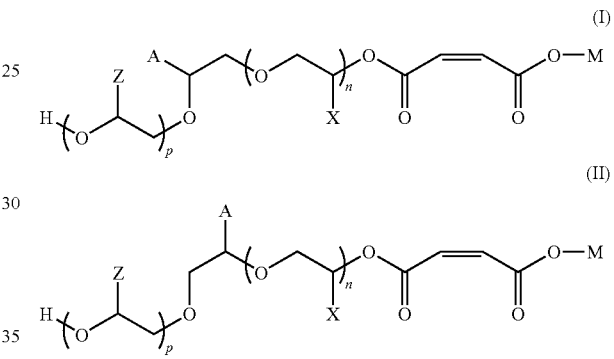

as copolymerizable emulsifiers in the emulsion polymerization of olefinically unsaturated monomers. In the course of the emulsion polymerization, the compounds (I) and (II) may be used individually or in a mixture with one another.

EO and/or PO Units

The compounds (I) and (II) comprise structural elements

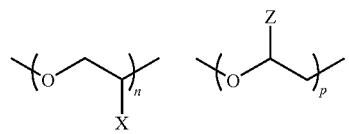

where—as already stated—the definitions are as follows:
X and Z independently are hydrogen or a methyl group
n and p independently are a number in the range from 0 to 40.

It is noted that the formula notation used is intended to express the fact that the stated structural elements derive respectively from ethylene oxide (EO) or propylene oxide (PO) namely insofar as—logically in the case where the indices m, n, and p are other than zero—these units result from the synthetic standpoint from an addition of EO or PO, or ethylene glycol or propylene glycol (for n, p=1), or polyaddition of EO and/or PO, or polyethylene glycol or polypropylene glycol, or corresponding mixed EO—PO copolymers (for n, p≧2).

It is further noted, expressly, that each of these structural elements independently may be constructed both exclusively of EO units and exclusively of PO units, or else may comprise EO units and PO units in mixed form, distributed randomly or in blocks. As a consequence of this, the formulaic representation used for the stated structural elements represents an abbreviated notation for the stated possibilities, which are obvious to a knowledgeable person of skill in the art.

Thus, for instance, X=H and n=5 means that the structural element in question contains five interlinked EO units, corresponding to a moiety —(O—CH$_2$—CH$_2$—)$_5$—; in contrast, X=CH$_3$ and n=5 means that the structural element contains five interlinked PO units, corresponding to a moiety —(O—CH$_2$—CH(CH$_3$))$_5$—, and—as the skilled person is aware—the orientation of the methyl group within the structural element may be realized for each PO unit in two ways, namely as —(O—CH$_2$—CH(CH$_3$))— or —(O—CH(CH$_3$)—CH$_2$)—.

The formulae (I) and (II) should be understood in the context of the present invention such that EO units and PO units may also be present simultaneously within the stated structural elements (which from a logical standpoint presupposes that the indices then each have a value of at least 2). The expression "independently" within the phrase "X and Z independently are hydrogen or a methyl group" refers, therefore, not only to the stated different structural elements, but also applies within one and the same structural element.

In accordance with what has been said, it is clear that, for instance, the formula (I) could be represented in a different notation as

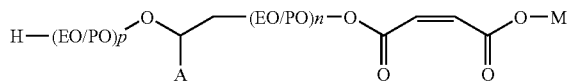

where the structural elements -(EO/PO)$_p$— and -(EO/PO)$_n$— may, as stated, comprise exclusively EO or PO units or mixtures of both units, and where each PO unit may be present in the orientation —(O—CH$_2$—CH(CH$_3$))— or —(O—CH(CH$_3$)—CH$_2$)—.

The Group M

As stated, M may have the following definition: hydrogen, alkali metal or alkaline earth metal, —NH$_3$ or an amine group.

Since M is not an "isolated" group, but is part of the group —COOM, it is clear to the skilled person that, depending on the definition of M, the group —COOM is either a free carboxylate group (M=H produces the group —COOH) or the salt form thereof (if M is not hydrogen, and has one of the other definitions).

The group —COOM may be present in partly or wholly neutralized form. The carboxylate group —COOH may be neutralized, for example, with alkali metal or alkaline earth metal hydroxides such as sodium, potassium, calcium or magnesium hydroxide, or with amines such as ammonia or ethanolamine. The salt form of the compounds (I) and (II) is notable for high water solubility.

The Compounds (I) and (II)

The alkyl group A comprises linear or branched, saturated or unsaturated alkyl groups having 3 to 40, preferably 10 to 20, more preferably 12 to 18 C atoms. Special preference is given to the following alkyl groups A: lauryl (C12), myristyl (C14), cetyl (C16), stearyl (C18), oleyl (olefinically unsaturated C18), and isotridecyl.

In one embodiment the degrees of alkoxylation for n and p in each case independently are in the range from 0 to 30, more particularly 0-20, more particularly 0-10, and more preferably 3-10.

The compounds of the formula (I) are obtainable, for example, by subjecting commercial alpha-olefins to epoxidation using formic acid and hydrogen peroxide, then opening the epoxide ring of the resultant intermediate 1 using water or ethylene glycol, and, if desired, alkoxylating (reacting with ethylene oxide and/or propylene oxide) the resultant intermediate 2. The resulting diol is then reacted with maleic anhydride, producing a maleic monoester, which if desired is neutralized.

Use of the Compounds (I) and (II)

The compounds (I) and (II) for use in accordance with the invention can be polymerized easily and completely together with other, different olefinically unsaturated monomers, and promote the formation of a foam-free, homogeneous emulsion.

Process for Preparing Polymers

The invention further provides a process for preparing polymers by emulsion polymerization of olefinically unsaturated monomers using the abovementioned compounds (I) and (II) as copolymerizable emulsifiers.

A feature of the process of the invention using the compounds (I) and (II), more particularly in salt form, is that polymers are obtained which have particular shear stability and electrolyte stability and also a low coagulum content.

One embodiment of the invention produces latices which in turn are also distinguished by particular water resistance and also stability toward temperature fluctuations, and in which there is no discernible migration of the emulsifier into the film.

Another advantage of the process of the invention, furthermore, is that it is virtually foam-free and reliably prevents the formation of volatile organic compounds. Since the incorporation of the emulsifiers (I) and (II) into the polymer is virtually quantitative, their use does not entail any problems with regard to biodegradability either. The olefinically unsaturated esters (I) and (II), furthermore, show virtually no proclivity to homopolymerization.

It has been found that, through the use of the compounds (I) and (II) as emulsifiers in emulsion polymerization, it is possible to obtain latices which, in relation to those latices prepared with comparable, noncopolymerizable emulsifiers, exhibit improved properties in respect of their electrolyte stability, their alkali resistance or their viscosity. Combinations of (I) and (II) with typical surfactants of nonionic and anionic types can also be employed, and likewise exhibit a positive profile of properties.

The latices of the invention can be used, for example, in the coatings industry. It has been found that coatings produced with the latices of the invention possess higher corrosion protection than conventional coatings.

Additionally it has been found that latices prepared using compounds of the general formula (I) and (II) as emulsifiers, in particular, have improved freeze/thaw stability as compared with those latices prepared using conventional emulsifiers.

Monomers

The olefinically unsaturated esters of the general formula (I) and (II) that are for use in accordance with the invention are suitable as emulsifiers in the emulsion polymerization of virtually all industrially significant, substantially water-insoluble monomers, but preferably (meth)acrylic compounds, styrene compounds, and vinyl compounds.

Typical examples of these monomers are vinylaromatics, e.g., styrene, divinylbenzene or vinyltoluene, polymerizable olefins and diolefins such as propene, butadiene or isoprene, esters of acrylic or methacrylic acid with linear or branched alcohols having 1 to 18 carbon atoms, more particularly of alcohols having 1 to 8 carbon atoms, and—with particular preference—of methyl esters, ethyl esters, and butyl esters thereof, vinyl esters of acids having 2 to 12 carbon atoms, more particularly vinyl acetate, vinyl propionate, vinyl 2-ethylhexanoate, and vinyl laurate, vinyl alkyl ethers with alkyl groups containing 1 to 8 carbon atoms, vinyl chloride, vinylidene chloride, and the like.

Monomers selected from the group consisting of alkyl acrylates, styrene acrylates, VeoVa® compounds or mixtures thereof, with or without addition of acrylic acid or methacrylic acid, are particularly preferred in the context of the present invention.

The monomers may, in the presence of the copolymerizable emulsifiers (I) and (II) for use in accordance with the invention, be homopolymerized or copolymerized with others of the stated compounds from the above listing. It is also possible to carry out copolymerizations where up to 50% by weight of further monomers, which are different from the compounds (I) and (II) of the invention and are inherently partly or wholly water-soluble, are involved, examples being acrylonitrile, methacrylonitrile, monoesters of maleic and/or fumaric acid with 1 to 8 carbon atoms, acrylic acid, methacrylic acid, maleic acid, fumaric acid, crotonic acid and/or itaconic acid.

In one embodiment, monomers used in the process of the invention are combinations of styrene/butyl acrylate, vinyl acetate/butyl acrylate or styrene/butadiene.

Coemulsifiers

In addition it is also possible to use the compounds (I) and (II), for use in accordance with the invention, in combination with known nonionic and/or anionic coemulsifiers. This may lead to dispersions with increased stability, with respect to shearing forces, temperature effects, and electrolytes, for example. In that case the coemulsifiers are added in amounts of 0.5% to 5% by weight, preferably 1% to 3% by weight, based on the entirety of the monomers employed. In this case it is possible to introduce the coemulsifiers at the beginning of the polymerization, together with the emulsifiers, or to meter them in over the course of the polymerization. Another version envisages preparing a pre-emulsion using—exclusively or in combination—the coemulsifiers, and metering in this pre-emulsion over the course of the polymerization. It is also possible, for the purpose of post-stabilizing the dispersions obtained using the acrylic and/or methacrylic esters of the invention, to add coemulsifiers to said dispersions.

The compounds (I) and (II) for use in accordance with the invention may also be employed together with protective colloids. Typical examples of these kinds of protective colloids are fully or partly hydrolyzed homopolymers and/or copolymers of vinyl acetate, e.g., partially hydrolyzed polyvinyl acetate, or fully hydrolyzed copolymers of vinyl acetate and vinyl ethers. Preferred copolymers have 1 to 4 carbon atoms in the ether part of the polyvinyl ether. Other protective colloids may derive from polysaccharides. Particular suitability, for instance, is possessed by cellulose ethers such as hydroxyethylcellulose, hydroxypropylcellulose, carboxymethylcellulose, methyl-cellulose, ethylcellulose or cellulose mixed ethers. Also suitable are polyacrylamide and also its copolymers with acrylic acid, acrylonitrile or acrylic esters. Condensation products of naphthalenesulfonic acid and formaldehyde, or other water-soluble formaldehyde resins, more particularly urea-formaldehyde resins, can be used as well. Finally, casein, gelatin, gum arabic, and also natural starch and substituted starch derivatives such as hydroxyethyl starch, are suitable protective colloids.

Emulsion Polymerization

In one embodiment the emulsifiers (I) and (II) are employed in the emulsion polymerization in amounts of in total 0.1% to 25% by weight, based on the sum of the monomers.

The aqueous dispersions to be prepared customarily in the first step of the process, using the compounds (I) and (II), contain in practice 15% to 75% by weight of polymerized monomers (dry residue) in water or in a mixture of water and water-soluble organic solvents. The dry residue range from 20% to 60% by weight is preferred; for specialty applications, however, aqueous dispersions with less than 15% by weight dry residue can also be prepared. In the aforementioned processes for emulsion polymerization it is also possible to employ other customary polymerization auxiliaries, more particularly initiators, examples being inorganic peroxide compounds such as potassium or ammonium persulfate or hydrogen peroxide; additionally, organic peroxide compounds or organic azo compounds, where they can be used for emulsion polymerization. The initiators are used in customary amounts, i.e., from 0.05% to 2% by weight, preferably from 0.1% to 0.5% by weight. Further suitable auxiliaries are buffer substances, examples being sodium hydrogencarbonate, sodium pyrophosphate or sodium acetate, which can be used in amounts of up to 2% by weight. Accelerants such as formaldehydesulfoxylate can also be used. Additionally it is possible to use customary molecular weight regulators used in emulsion polymerization, examples being butenol or else organic thio compounds such as mercaptoethanol, thioglycolic acid, octyl mercaptan or tert-dodecyl mercaptan. For the conduct of the polymerization processes, various methods are contemplated that are commonly employed in emulsion polymerization, as for example the total inclusion of all the reactants in the initial charge, a monomer feed or an emulsion feed. For this purpose, generally speaking, the temperature of the polymerization medium is held in a range from 40 to 100° C., more particularly 50 to 90° C. The pH maintained is appropriately in a range between 3 and 9, although emulsion polymerization at lower pH levels is also possible with the compounds of the invention. The aforementioned possible process variants for the emulsion polymerization are carried out appropriately in coolable and heatable vessels provided with stirrer and temperature measurement equipment, such as in stirred pressure vessels, for example. Likewise possible is the use of coiled-tube reactors or what are called loop reactors. After the end of the polymerization, the polymer dispersion is appropriately cooled and removed from the reactor via sieving devices. If the reaction products are to be isolated as solid products, the polymer dispersion is appropriately precipitated or spray-dried. Preferably, however, the dispersions obtained in the polymerization are used directly as binders for paints, adhesives, papercoating slips, and other coating materials. Other conditions for processes for the emulsion polymerization using the compounds (I) and (II) for use in accordance with the invention may be freely selected or adapted by the skilled person in conventional manner to the particular requirements.

EXAMPLES

Emulsifiers

C12 Maleate:

This is a substance according to formulae (I) and (II) of the present invention. It was prepared as follows: 98 g (1 mol) of maleic anhydride were melted in a flask and admixed with 4.4 g of sodium carbonate. At 90° C., with stirring and with nitrogen being passed through the system, 618.18 g (1 mol) of 1,2-dihydroxydodecane-10EO (adduct of 10 mol of ethylene oxide with 1 mol of 1,2-dihydroxydodecane) were added. The esterification reaction was monitored by checks on the acid number. After the conclusion of the reaction, the product was neutralized using aqueous sodium hydroxide solution, and adjusted to a solids content of 30%.

SUS 87:

This is the commercial product "DISPONIL® SUS 87", available from Cognis.

Test Methods

The emulsions prepared were characterized using the following parameters:

The dry residue was determined as follows: 5 grams of the emulsion were introduced into a Satorius 709301 drying apparatus, and dried to constant weight. The result is reported in percent by weight dry residue. This is the meaning of the data in the table below.

The viscosity of the emulsions prepared was determined by the Brookfield method at 20 rpm, using spindle 1, the emulsions being employed as they were.

The pH of the emulsions prepared was determined electrochemically in accordance with DIN 19268, using a pH electrode.

The average particle diameter of the emulsions prepared was determined by means of a Coulter Nano-Sizer. The figures for the particle diameter in the table below are reported with nm (nanometers) as the unit.

The total coagulum content of the emulsions prepared was determined gravimetrically after filtration through an 80 micrometer filter (wet coagulum).

The coagulum content thus determined is reported as % coagulum based on the solids content of the emulsion. The solids content of the emulsion here means the amount of monomers employed.

The coagulum content is an important variable to the skilled person for assessing the quality of an emulsion prepared by emulsion polymerization.

The electrolyte stability of the emulsions prepared was determined by treating samples of this emulsion (10 g) each with 10 ml of 6 different electrolyte solutions and checking for formation of coagulum. The electrolyte solutions were 1% and 10% solutions of each of NaCl, $CaCl_2$, and $AlCl_3$. The datum reported was the strongest electrolyte solution for which there was still no formation of coagulum.

The alkali resistance was determined by preparing a dry polymer film from the emulsion and storing it in an aqueous NaOH solution (4%). After 24 and 48 hours, the film was inspected for whitening and graded on a scale from 0 (no change) to 5 (complete white hazing).

Preparation of Latices

Example 1

Inventive

A reactor vessel was charged with 377.20 g of distilled water, 1.24 g of sodium acetate, 0.12 g of ammonium iron sulfate hexahydrate, 8.43 g of sodium ethene-sulfonate, and 0.19 g of sodium disulfite. The reaction mixture was flushed with nitrogen, heated to 55° C., and admixed with an initiator solution 1 made up of 1.01 g of sodium persulfate and 12.14 g of distilled water. The subsequent 3 hours saw the metered additions, separately, of a monomer mixture of 379.28 g of vinyl acetate and 126.43 g of VeoVa® 10, and an emulsifier solution made up of 10.11 g of C12 maleate in 62.71 g of distilled water. VeoVa® 10 is the vinyl ester of Versatic™ 10, a synthetic saturated monocarboxylic acid with a highly branched structure containing 10 carbon atoms, provided by Hexion.

The temperature was then raised to 85° C., an initiator solution 2 made up of 0.51 of sodium persulfate in 12.14 g of distilled water was added, and post-polymerization was conducted for 1 hour. After the end of reaction, the resultant latex was filtered, neutralized with ammonium hydroxide solution, and adjusted to a pH of 7 to 8.

Example 2

Comparative

Like example 1, but replacing the C12 maleate with the same amount of DISPONIL® SUS 87.

Test Results

The latices prepared were characterized more closely. The results are evident from Table 1.

TABLE 1

|  | Latex of Ex. 1 | Latex of Ex. 2 |
|---|---|---|
| Particle size [nm] | 330 | 273 |
| Viscosity (20° C.) [mPas] | 770 | 1210 |
| Electrolyte stability | 1% $CaCl_2$ | 1% $CaCl_2$ |
| Alkali resistance after 24 h | 3 | 0 |
| Alkali resistance after 48 h | 3 | 0 |

Determination of Freeze/Thaw Stability

Example 3

Inventive

The inventive emulsion of example 1 was cooled from 23° C. to −5° C. over the course of 16 hours, and on reaching the latter temperature was warmed again to 23° C. over the course of 8 hours. After this the emulsion was inspected for homogeneity. This cycle was run through a total of five times, the minimum temperature in each cycle being lowered by a further 5° C., i.e., in the second cycle cooling took place to −10° C., in the third cycle to −15° C., and so on. The inventive emulsion according to example 1 was still homogeneous after five cycles, i.e., was in the form of an intact emulsion.

Example 4

Comparative

The process according to example 3 was applied to the comparative latex from example 2. In this case it was found that the emulsion exhibited phase separation after just the first cycle. The coagulum formed was not redispersible.

What is claimed is:

1. A method of emulsion polymerization comprising the steps of:
    (a) adding one or more copolymerizable emulsifiers selected from the group consisting of maleic esters of formulae (I) and (II), to at least one olefinically unsaturated monomer, to form a monomer mixture;

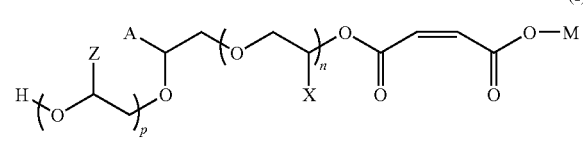
(I)

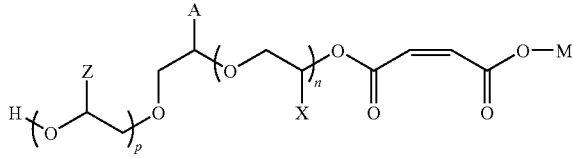
(II)

(b) emulsifying said monomer mixture to form an emulsion; and
    (c) polymerizing said emulsion;
    wherein A is a C10-C20 alkyl group;
    X and Z independently are hydrogen or methyl;
    M is hydrogen, an alkali metal, alkaline earth metal, or an ammonium or other amine salt; and
    n is a number in the range from 0 to 40 and p is a number in the range of 3-10.

2. The method of claim 1, wherein n is in the range of 3 to 10.

3. The method of claim 1, wherein A is a C12-C18 alkyl group.

* * * * *